Aug. 29, 1939.  A. ORSCHELN  2,171,403
BRAKE MECHANISM
Filed Aug. 27, 1938
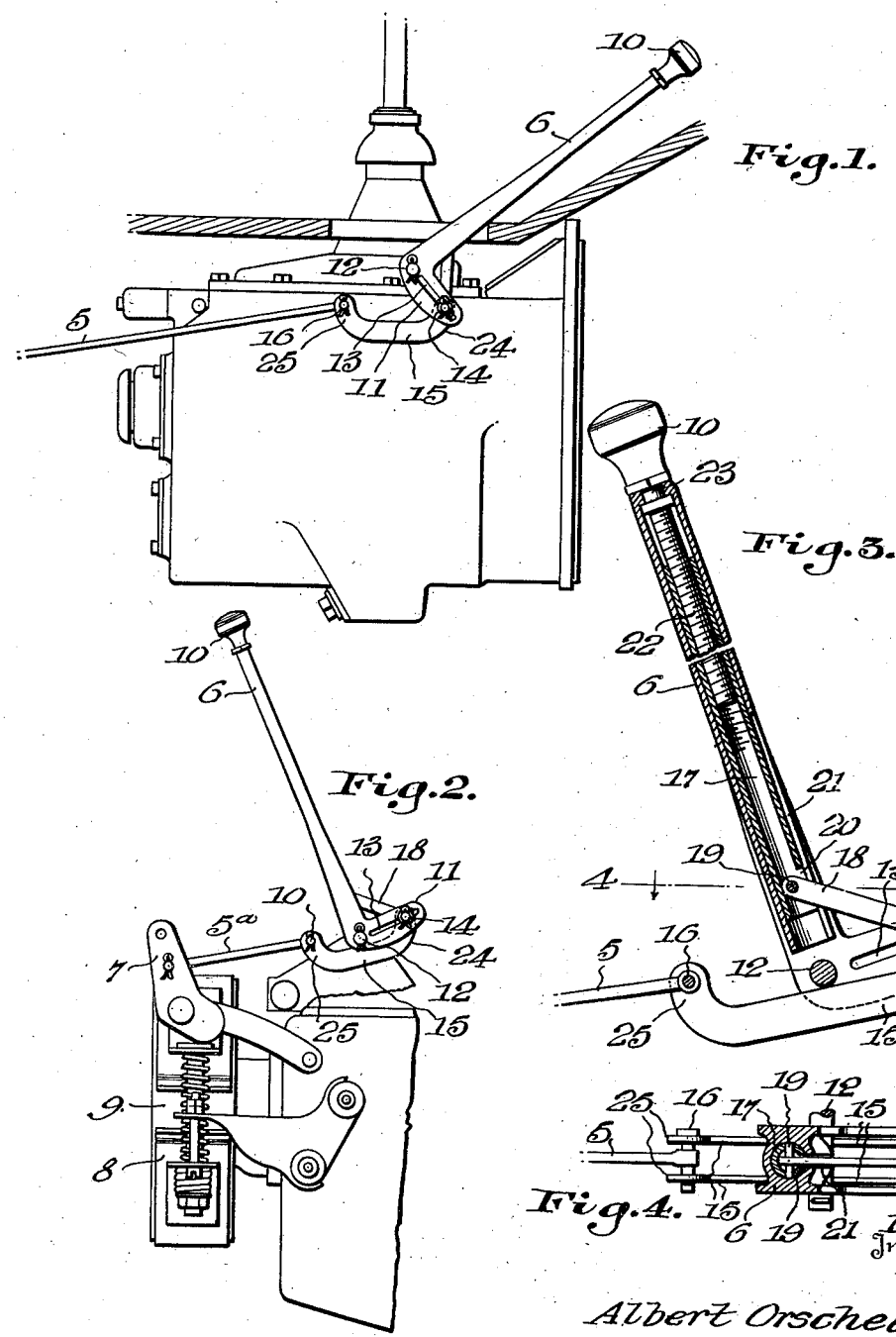
Inventor
Albert Orscheln Patented Aug. 29, 1939

2,171,403

UNITED STATES PATENT OFFICE 2,171,403

BRAKE MECHANISM

Albert Orschein, Moberly, Mo.

Application August 27, 1938, Serial No. 227,187

6 Claims. (Cl. 188—196)

The invention relates primarily to brake mechanisms for motor vehicles, whether passenger cars, trucks or tractors, and it relates more particularly to the hand brakes of such vehicles.

The principal object of the invention is to provide a novel brake mechanism having adjusting means on the hand brake lever and readily adjustable at any time by the driver for so adjusting the connecting means between said lever and the brake or brakes, as to compensate for wear.

A further object is to provide a novel arrangement whereby no dog and segment are required to hold the hand brake lever in brake-applied position.

With the foregoing in view, the invention resides in the novel subject matter hereinafter described and claimed, description being accomplished by reference to the accompanying drawing.

Fig. 1 is a side elevation showing the hand brake lever operatively connected with a rod for applying brakes on the vehicle wheels.

Fig. 2 is a view similar to Fig. 1 but illustrating the lever associated with a brake on the vehicle drive shaft.

Fig. 3 is an enlarged vertical sectional view through the hand lever and associated parts.

Fig. 4 is a horizontal sectional view on line 4—4 of Fig. 3.

In the drawing above briefly described, preferred features of construction have been shown, and while such features will be rather specifically described, it is to be understood that within the scope of the invention as claimed, numerous variations may be made. Moreover, it will be obvious that the novel construction associated with the hand lever need not necessarily form part of a brake mechanism but could be used in connection with any other mechanism to be operated by a hand lever, and of such nature as to require adjustment from time to time of the connecting means between the lever and the contrivance to be operated thereby.

In Fig. 1, I have illustrated a rod 5 to be connected in any of the well known ways with wheel brakes of an automobile, said rod being operatively connected with a hand brake lever 6 by a novel arrangement of elements hereinafter described. In Fig. 2 the lever 6 is connected in the same way with a rod 5ª connected with the brake contracting lever 7 of a brake band 8 surrounding the drum 9 on a vehicle drive shaft. The rod 5 or 5ª is so connected with the lever 6 that it and the remainder of the connecting means between lever and brake, may be adjusted to compensate for wear, simply by rotating a knob 10 on the free end of the lever 6, all of which will be more clearly understood as the description proceeds.

In the form of construction herein disclosed, the lever 6 is of tubular form and is provided with two lateral arms 11 at an angle to the length of the lever and disposed substantially radially with respect to the lever fulcrum 12, said arms 11 having opposed longitudinal slots 13 through which a pivot pin 14 passes for adjustment into any desired spaced relation with the fulcrum 12, said pin 14 passing through the front ends of parallel links 15 whose rear ends are connected by a pin or the like 16 with the rod 5 or 5ª. By rotation of the knob 10, the pin 14 may be at any time adjusted further from the fulcrum 12, thus insuring that a predetermined movement of the lever 6 will so pull the connecting means between brake and lever, as to fully apply the brake, it being thus possible to compensate for brake wear at any time by rotating said knob.

In the present disclosure, the lever 6 is of tubular form, and a tubular slide 17 is mounted in the lower portion of said lever. From the lower end of this slide, an adjusting link 18 extends to the pin 14, said link extending obliquely across the angle between the lever 6 and the arms 11 and being pivoted at 19 to said slide 17. Thus, by adjusting the slide 17 downwardly, the pin 14 is forced to slide outwardly in the guide slots 13, and adjustment is thus effected to compensate for brake wear. Also, by adjusting the slide 17 upwardly, the pin 14 is moved inwardly toward the fulcrum 12, this being done after brake relining or adjustment of the brake shoes or band with respect to the drum or drums. In the present showing, the slide 17 is provided with a slot 20, and the lower portion of the lever 6 is formed with a slot 21 through both of which the link 18 passes.

I have illustrated a screw 22 threaded into the upper end of the tubular slide 17 and suitably fixed to the knob 10, said screw being rotatably mounted at 23 in the outer end of the lever 6. Rotation of the knob 10 thus rotates screw 22, causing it to adjust the tubular slide 17, whereupon the link 18 adjusts the pin 14 in the guide slots 13, as the occasion may demand.

In the present disclosure, the links 15 are provided with upwardly turned front ends 24 through which the pin 14 passes, and with upwardly turned rear ends 25 through which the pin 16 extends, the relation of said links 15 and pin 14 with respect to the lever fulcrum 12, being such that said pin 14 will move slightly past dead center when the lever 6 is pulled rearwardly to effect maximum brake application. In other words, the brake-applying line of pull terminating at the pin 14 will move from the lower side of the fulcrum 12 to the upper side of said fulcrum when the lever 6 is pulled to brake-applied position. Thus, the rearward pull of the connecting means between the lever and the brake, will be directed on a line above the axis of the fulcrum 12, thereby holding the lever 6 in brake-applied position without the necessity of a dog and sector, or other similar provision. In order to limit the movement of the pin 14 past dead center, the upper edges of the links 15 may strike the fulcrum 12 which, in the present showing, extends through the inner ends of the arms 11, as seen in Fig. 3.

It will be seen from the foregoing that the connecting means between the hand brake lever and the brake, may be readily adjusted at any time by the driver to compensate for brake wear. It will also be seen that whenever the hand brake is to be set, it is simply necessary to pull rearwardly to the maximum upon the lever, whereupon this lever will remain in brake-applied position until pushed forwardly therefrom.

In actual use, excellent results are being obtained from the general construction shown and described. This construction is, therefore, preferably followed, but attention is again invited to the possibility of making variations within the scope of the invention as claimed.

I claim:

1. In combination, a brake, a lever for applying and releasing said brake, connecting means between said brake and said lever including a pull link and a pin connecting said pull link with said lever, the relation of said pull link and pin with the lever fulcrum being such that the brake-applying line of pull terminating at said pin will move from one side of said lever fulcrum to the opposite side thereof when said lever is moved to brake-applied position, causing said lever to remain in said brake-applied position until forced therefrom, said combination having provision for limiting the extent which said lever may move in brake-applying direction.

2. The combination specified in claim 1; together with manually operable means on said lever for adjusting said pin away from said fulcrum to compensate for brake wear, said manually operable means having a readily accessible operating member.

3. A brake operating or similar mechanism comprising a lever having a guide extending substantially radially with respect to its fulcrum, a pivot member engaged with said guide for connection with an element to be operated by said lever, a link connected at one of its ends with said pivot member, a slide mounted on said lever for movement longitudinally thereof, the other end of said link being pivoted to said slide, and manually operable means on said lever for adjusting said slide along said lever, causing said link to adjust said pivot member along said guide to vary its distance from the lever fulcrum.

4. A brake operating or similar mechanism comprising a lever, a pivot member for connecting an element to be operated with said lever, means slidably mounting said pivot member on said lever for adjustment toward and from the lever fulcrum in a direction at an angle to the length of said lever, a slide mounted on said lever for adjustment longitudinally thereof, a link extending obliquely from said slide to said pivot member and connected with both thereof for adjusting said pivot member toward or from the lever fulcrum when said slide is adjusted along said lever, and manually operable means on said lever for adjusting said slide.

5. A brake operating or similar mechanism comprising a lever having a lateral arm disposed substantially radially with respect to its fulcrum, a pivot member slidably engaged with said arm for adjustment along the same, said pivot member serving to connect said lever with an element to be operated thereby, a slide mounted on said lever for adjustment longitudinally thereof, a link extending obliquely from said slide to said pivot member and connected with both thereof for adjusting said pivot member along said arm as said slide is adjusted along said lever, and manually operable means on said lever for adjusting said slide.

6. A brake operating or similar mechanism comprising a tubular lever having a pair of parallel lateral arms disposed substantially radially with respect to its fulcrum, said arms having opposed longitudinal slots, a pivot pin passing through said slots for adjustment longitudinally thereof, said pivot pin serving to connect said lever with an element to be operated thereby, a tube slidable in said tubular lever, a link between said arms extending obliquely from said tube to said pivot pin and connected with both thereof for adjusting said pivot pin along said slots when said tube is longitudinally adjusted in said lever, and a hand screw threaded into said tube and rotatably mounted in the free end of said lever for adjusting said tube to effect said pin adjustment.

ALBERT ORSCHELN.